(No Model.)
N. A. WHEELER.
CALENDAR.
No. 445,484.　　　　　　　　　　Patented Jan. 27, 1891.
Fig. 1.
Fig. 2.
Fig. 3.
Fig. 4.
Fig. 10.
Fig. 11.
WITNESSES:
J. H. Thiebrath
D. L. Hazard
INVENTOR:
N. A. Wheeler
BY
Munn & Co.
ATTORNEYS

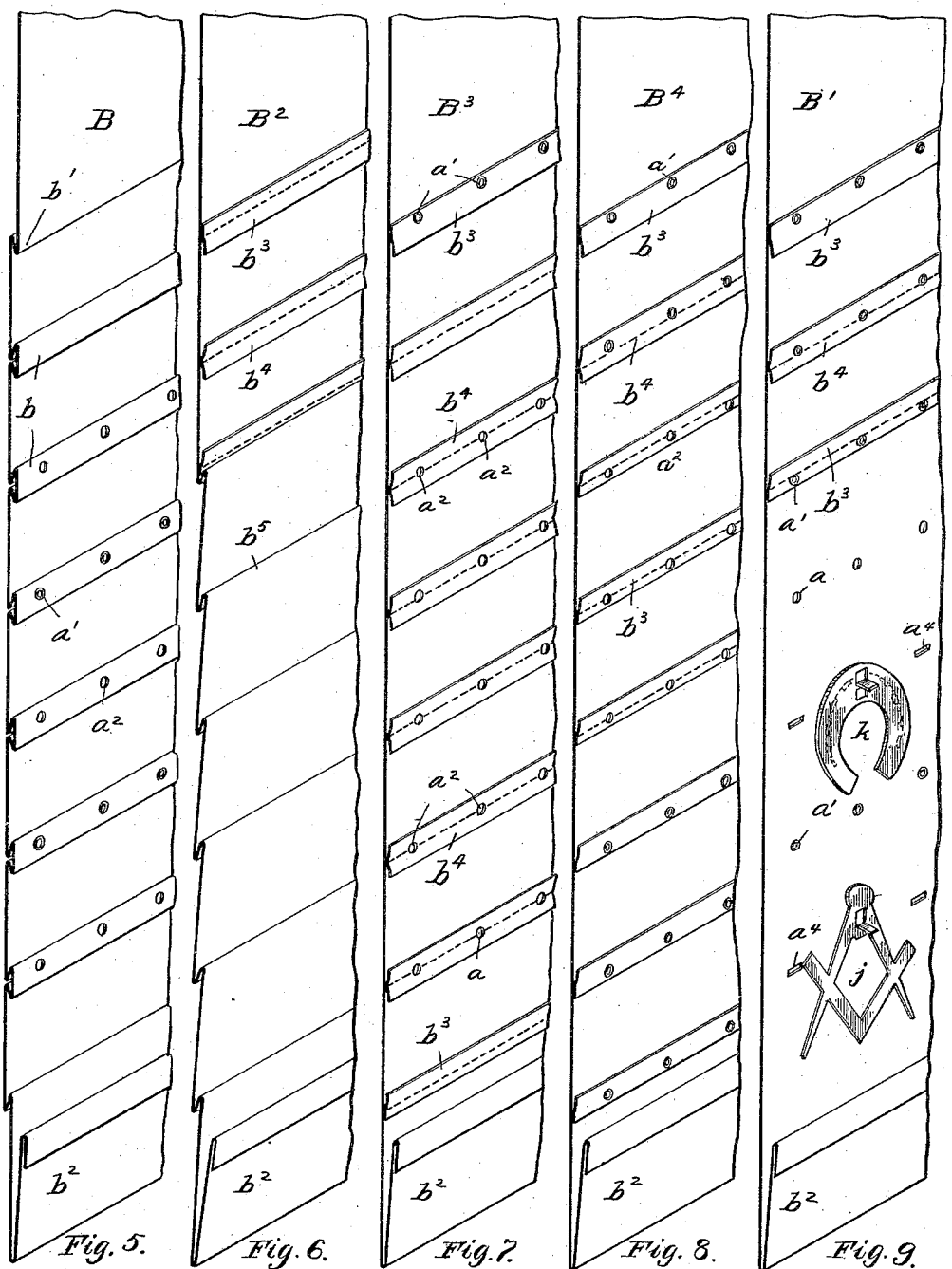

UNITED STATES PATENT OFFICE.

NATHAN A. WHEELER, OF ALPOWA, WASHINGTON.

CALENDAR.

SPECIFICATION forming part of Letters Patent No. 445,484, dated January 27, 1891.

Application filed July 8, 1890. Serial No. 358,068. (No model.)

*To all whom it may concern:*

Be it known that I, NATHAN A. WHEELER, of Alpowa, in the county of Garfield and State of Washington, have invented a new and Improved Calendar, of which the following is a full, clear, and exact description.

My invention relates to improvements in calendars, both in calendars of the ordinary kind and in perpetual calendars; and the object of my invention is to provide a calendar that will invariably and accurately indicate the day of the week, month, and year, and also to provide means for changing the indicators of the calendar from day to day, week to week, month to month, and year to year.

To this end my invention consists in a calendar having the usual stationary numbers thereon, and having upon its face horizontal or perpendicular slides, grooves, ridges, stitches, or other means of adjustably supporting a slip indicating a day, month, or year, and having its face also provided with perforations, eyelets, stitches, or other means for attaching or holding an indicator thereon.

My invention further consists in peculiar forms of frames adapted to be attached or held upon the face of the calendar, so as to encircle a date and thereby prominently display the same.

Reference is to be had to the accompanying drawings, forming a part of this specification, in which similar letters of reference indicate corresponding parts in all the figures.

Figure 1 is a front elevation of an ordinary yearly calendar, having eyelets therein for suspending an indicating-frame, and having an indicating-frame suspended thereon. Fig. 2 is a front elevation of a similar calendar, but with its face provided with perforations and stitches to afford means of suspending an indicating-frame. Fig. 3 is a front elevation of a perpetual calendar having three-ply plaits thereon at regular distances, so as to afford means of adjustably holding the slips indicative of the days of the week and the month of the year. Fig. 4 is a front elevation of a perpetual calendar having a different form of plait thereon, and having perforations, eyelets, and apertures therein to afford means of suspending an indicating-frame, two forms of indicating-frames being attached to said calendar. Fig. 5 is a broken perspective view of a calendar having horizontal double three-ply plaits with perforations and eyelets therein, and with a pocket formed at the bottom. Fig. 6 is a broken perspective view of a calendar, having single horizontal plaits therein, and having also horizontal bands attached to the face to afford means for suspending the necessary slips or indicating-frames. Fig. 7 is a broken perspective view of a calendar, showing other forms of horizontal bands to hold the necessary slips and indicating-frames, said bands being also provided with perforations. Fig. 8 is a detail perspective view of still another form of calendar having other forms of horizontal bands thereon, said bands being provided with perforations and eyelets. Fig. 9 is a broken perspective view of a calendar having horizontal bands thereon, and having perforations, eyelets, and rectangular apertures therein to afford means for suspending an indicating-frame, said calendar combining many of the features of the other calendars. Fig. 10 is a detail perspective view of an indicating-frame in the form of an ellipse. Fig. 11 is a detail front and side elevation of indicating-frames in the form of a square. Fig. 12 is a detail perspective view of an indicating-frame in the form of a cross, and Fig. 13 is a front and side elevation of a square indicating-frame having a peculiar form of handle.

The calendar A, as shown in Fig. 1, is of the ordinary type, having the year, the month, and days of the week arranged thereon in the usual manner, and the calendar is provided with eyelets $a'$, extending through the various sheets and adapted to support an indicating-frame $c$, which is hung in one of the eyelets so as to encircle a particular date, and by moving the indicating-frame from day to day one space to the right or left, as the case may require, the day of the month and week will always be plainly indicated. The indicating-frame $c$ may be made in any desired form, as described below.

As shown in Fig. 2, the calendar A' is provided with the usual stationary letters and figures indicative of the year, month, week, and day, and said calendar is also provided with perforations $a^2$ and stitches $a^3$, the perforations and stitches being arranged above the dates on the calendar, so that an indicating-frame, such as any of the forms described below, may be suspended in the perforations or upon the stitches, so as to encircle or point to a certain date, and by shifting the indicator from day to day the day of the week, year, and month will always be accurately indicated. In these two calenders A and A', I have shown perforations, eyelets, and stitches for suspending the indicating-frames; but I do not confine myself to such means of suspending the frames, as any other form of attachment may be used, it only being necessary that the indicating-frames be detachably connected with the calendar-sheet, so that they may be easily changed from day to day.

In Fig. 3 I have shown a perpetual calendar B, having horizontal folds or plaits $b$ extending across its face, said folds being made so as to form grooves upon the upper and lower sides of the same between the folds and the face of the calendar, so that an indicating-frame, as $c$, may slide between two of the plaits and be held securely in place. The calendar is also provided near the top with a single fold $b'$, which is arranged parallel with the folds or plaits $b$. A slip $d$, having marked or inscribed thereon in any manner so as to legibly or intelligibly indicate the month and year, is placed between the plait $b'$ and the upper plait $b$, so as to clearly indicate the month and year. Between the next two plaits $b$, below the slip $d$, are placed slips $e$, having the days of the week or the abbreviations thereof inscribed or otherwise placed thereon, said slips corresponding in width to the width of the calender-lines, between which the stationary date figures are placed. The slips $d$ and $e$ may be removed, and the calendars of the perpetual type should be provided with a pocket $b^2$ at the bottom, formed by doubling over the lower edge of the calendar-sheet and fastening the same in position, said pocket being adapted to hold the slips $d$ and $e$ not in current use.

It is obvious that in using a perpetual calendar there should be slips $d$, representing all the months of a year, and slips $e$, representing all the days of the week.

The calendar B is provided with perforations $a^2$ extending through the plaits or folds $b$ above each date on the calendar, so as to afford means for securing an indicating-frame thereon. As shown in Fig. 3, the indicator $c$ is adapted to slide between the folds or plaits $b$; but it is also provided with a hook $c'$, by which it may be suspended in one of the perforations $a^2$, as desired.

As shown in Fig. 4, the calendar B' is provided near the top with three horizontal bands $b^3$, so as to form suitable slides between the bands, and the slips $d$ and $e$, representing the month, year, and days of the week, are placed between the bands $b^3$, in the manner described above. The calendar B' is provided with perforations $a^2$, with eyelets $a'$, and with rectangular apertures $a^4$ to afford means of attaching the various forms of indicating-frames thereto.

The calendar $B^2$, as shown in Fig. 6, is provided with a band $b^4$, extending horizontally across the upper portion of the calendar, to afford means of attaching the slips $d$ and $e$, the said band being secured longitudinally through the center, so as to form grooves on the upper and lower sides thereof between the band and the calendar-sheet, and a single band $b^3$, as described above, is attached to the sheet above and below the band $b^4$, so as to form convenient slides for the slips $d$ and $e$. The calendar $B^2$ is also provided with single horizontal plaits or folds $b^5$, upon which an indicating-frame may be suspended, said plaits also forming grooves, in which any suitable indicating-frame may be inserted, if desired.

The calendar $B^3$, as shown in Fig. 7, is provided at the top and bottom with the bands $b^3$, and between these with the horizontal bands $b^4$, said bands forming grooves, as above described, to hold the slips indicative of the year, month, or day, and to also hold various forms of indicating-frames, which may be moved horizontally between the bands. The bands are also perforated, as shown, to afford means of suspending the indicating-frames, if desired.

The calendar $B^4$, as shown in Fig. 8, is provided with bands $b^3$ and $b^4$, arranged substantially as described above, and provided with perforations $a^2$ and eyelets $a'$ to afford means of attaching the indicators or indicating-frames.

I have shown the different ways of holding the slips $d$ and $e$, not with a view of exhausting all the various ways of attachment, but simply to show that the slips may be held in a great variety of ways, and that likewise the indicating-frames may be held to slide between horizontal bands, ridges, grooves, &c., or that they may be suspended from the calendar-sheet, if desired. The calendars of the various forms should be provided with perforations $a^3$ to afford means of suspending them from a wall, or they may have any of the usual forms of suspension.

As shown in Fig. 10, the indicating-frame or indicator $g$ is made in the form of an ellipse, its two ends $g'$ being turned in opposite directions, so that one may be inserted in a perforation, eyelet, or aperture in the calendar above a particular date, and the other end will form a convenient handle by which the indicator may be moved.

The indicator $f$, as shown in Fig. 11, is made in the form of a square adapted to encircle a particular date, said indicator having upon one side a handle $f'$, formed of laterally-extending parallel nibs, and having upon the opposite side a suitable hook $f^2$, by means of which it may be attached to the perforations, eyelets, apertures, stitches, grooves, &c., of the calendar.

In Fig. 12 the indicator $h$ is made in the form of a cross adapted to be hung above a particular date, the indicator having a suitable handle $h'$, extending from one side, and a suitable hook $h^2$ from the opposite side, to afford means of attachment to the calendar-sheet, as described above. Fig. 13 represents an indicator $f^3$ in the form of a square, substantially like the indicator $f$ already described, it having a laterally-extending handle $f^4$ and a suitable hook $f^2$ for attachment to the calendar-sheet. I have also shown an indicating-frame $j$ in the form of a square and compass, and an indicating-frame $k$ in the form of a horseshoe, said indicating-frames being suspended on the calendar $B'$, as shown in Fig. 9. I have also shown a circular indicating-frame $l$, attached to the calendar $B'$ in Fig. 4.

I have shown a few designs of indicating-frames to illustrate the fact that they may be made in any desired form, plain, symbolic, or artistic, or to suit the particular fancy of any user of the calendar, and while I have shown the indicators provided with a peculiar form of handle and hook I do not confine myself to any means of attaching them to the calendar-sheet, as they may be attached thereto or secured thereon in any manner so as to be easily detachable and removable, or the indicators may be made without hooks and handles and may slide horizontally upon the face of the calendar-sheet, if desired.

It is desirable in carrying out my invention to have the plaits, bands, grooves, &c., on the calendar-sheet run horizontally across the same; but it is obvious that they might be run perpendicularly or even diagonally without departing from the principle of my invention.

In using the calendar any of the various forms of indicating-frames are suspended above a certain date, and each day thereafter the frames are moved one space to the right or left, as the case may be, thus always indicating accurately the day of the week, month, and year, and as the slips representing the year, month, and days of the week are removable and adjustable it is obvious that the calendar may be used perpetually.

The calendars will be found very useful in business offices, as they will so accurately indicate the day of the week, month, and year that mistakes in dates will be practically impossible.

Having thus described my invention, I claim as new and desire to secure by Letters Patent—

1. The combination of the calendar-sheet having the customary numeral dates thereon, the frames adapted to indicate a particular date, and means for attaching the frames to the calendar-sheet opposite each date-numeral, substantially as described.

2. The combination, with a calendar-sheet having the usual dates thereon and having supports adjacent to each date, of indicating-frames adapted to encircle or point out a particular date, said frames having laterally-extending hooks to engage a support on the calendar-sheet, substantially as described.

3. The combination, with a calendar having stationary date-marks thereon and slideways above the date-marks, of slips adapted to slide in the ways, said slips to represent the year, month, and days of the week, substantially as described.

4. The combination, with a calendar having the usual date-marks thereon and having a pocket, as described, of slips representing the year, month, and days of the week, and means for securing said slips upon the calendar, so that they may be moved thereon, substantially as described.

5. A calendar comprising a calendar-sheet having the usual date-marks thereon with perforations and stitches, as shown, and having a pocket, as described, slips representing the year, month, and days of the week attached to the calendar-sheet, so as to be movable thereon, and indicators adapted to point out a particular date, said indicators being removably attached to the calendar-sheet, so as to be moved thereon from day to day, substantially as described.

NATHAN A. WHEELER.

Witnesses:
T. DRISCOLL,
R. E. WILLS.